US012635673B2

(12) United States Patent
     Bahlenberg

(10) Patent No.: US 12,635,673 B2
(45) Date of Patent: May 26, 2026

(54) SYSTEM FOR DETERMINING A WALKED DISTANCE OF AN ANIMAL WITHIN A BARN

(71) Applicant: DELAVAL HOLDING AB, Tumba (SE)

(72) Inventor: Peter Bahlenberg, Tumba (SE)

(73) Assignee: DeLaval Holding AB, Tumba (SE)

( * ) Notice: Subject to any disclaimer, the term of this patent is extended or adjusted under 35 U.S.C. 154(b) by 374 days.

(21) Appl. No.: 18/575,735

(22) PCT Filed: Jun. 23, 2022

(86) PCT No.: PCT/SE2022/050630
     § 371 (c)(1),
     (2) Date: Dec. 29, 2023

(87) PCT Pub. No.: WO2023/277767
     PCT Pub. Date: Jan. 5, 2023

(65) Prior Publication Data
     US 2024/0315209 A1    Sep. 26, 2024

(30) Foreign Application Priority Data
     Jul. 1, 2021    (SE) .................................... 2130185-8

(51) Int. Cl.
     A61B 5/00        (2006.01)
     A01K 11/00       (2006.01)
     (Continued)

(52) U.S. Cl.
     CPC .......... A01K 29/005 (2013.01); A01K 11/006 (2013.01); A61D 17/002 (2013.01)

(58) Field of Classification Search
     CPC .. A01K 29/005; A01K 11/006; A61D 17/002; G06Q 50/02
     See application file for complete search history.

(56) References Cited

U.S. PATENT DOCUMENTS 10,238,092 B2 *  3/2019  Bonge, Jr. .............. G16H 40/67
10,251,371 B1 *  4/2019  Landers ................... G06N 5/04
                        (Continued)

FOREIGN PATENT DOCUMENTS

CN      105095617 A      11/2015
CN      108990831 A      12/2018
                (Continued)

OTHER PUBLICATIONS

International Search Report for PCT/SE2022/050630 mailed Sep. 28, 2022, 4 pages.
                (Continued)

*Primary Examiner* — May A Abouelela

(74) *Attorney, Agent, or Firm* — NIXON & VANDERHYE

(57)                 ABSTRACT

System for determining a respective walked distance of animals in a barn during a predetermined time period. The system includes a Real-Time Location System, a database storing historical trajectories of the animals and a processing controller. The processing controller is configured to determine the walked distance of the animal by establishing a walked trajectory based on obtained data entities, and store the trajectory in the database associated with the animal; or detecting a gap of missing or incomplete data entities among the obtained data entities; and establish the trajectory by inserting replacement distance data in the gap, based on historical trajectories extracted from the database and store the established trajectory in the database.

12 Claims, 6 Drawing Sheets

(51) Int. Cl.
 *A01K 29/00* (2006.01)
 *A61D 17/00* (2006.01)

(56) References Cited

U.S. PATENT DOCUMENTS

| | | | |
|---|---|---|---|
| 10,262,331 | B1 | 4/2019 | Sharma et al. |
| 10,420,634 | B2* | 9/2019 | Folkers ................. A01K 11/006 |
| 11,071,279 | B2* | 7/2021 | Singh .................... A01K 11/008 |
| 11,373,427 | B1* | 6/2022 | Monk .................... G06V 20/52 |
| 12,096,308 | B2* | 9/2024 | Williams ............ G06F 21/6245 |
| 12,144,320 | B2* | 11/2024 | Bateman .............. A01K 11/006 |
| 2011/0148639 | A1* | 6/2011 | Geissler ............... A01K 29/005 |
| | | | 340/573.1 |
| 2012/0206454 | A1 | 8/2012 | Alasaarela |
| 2012/0226751 | A1* | 9/2012 | Schwaderer ......... A01K 11/006 |
| | | | 709/204 |
| 2012/0239303 | A1 | 9/2012 | Rajkondawar et al. |
| 2013/0269618 | A1 | 10/2013 | Van Der Tol et al. |
| 2015/0308843 | A1 | 10/2015 | Ding et al. |
| 2015/0351885 | A1* | 12/2015 | Kool .................... A61B 5/1118 |
| | | | 600/551 |
| 2015/0379324 | A1* | 12/2015 | Hofman .................... G06T 7/73 |
| | | | 382/110 |
| 2016/0165852 | A1* | 6/2016 | Goldfain .............. A01K 27/001 |
| | | | 340/573.3 |
| 2016/0178392 | A1* | 6/2016 | Goldfain .............. G01C 22/006 |
| | | | 702/158 |
| 2017/0189155 | A1* | 7/2017 | Crosby ................ A01K 1/0023 |
| 2017/0311574 | A1* | 11/2017 | Swan ..................... G06V 40/10 |
| 2017/0325426 | A1* | 11/2017 | Brosh .................. A61B 5/0022 |
| 2018/0035648 | A1* | 2/2018 | Ikeda ................... A01K 11/006 |
| 2018/0146645 | A1* | 5/2018 | Arbel ................. G06Q 10/0833 |
| 2018/0146646 | A1* | 5/2018 | Ikeda ................... A61D 17/002 |
| 2018/0160650 | A1 | 6/2018 | Auer et al. |
| 2018/0279583 | A1 | 10/2018 | Yajima et al. |
| 2019/0098869 | A1* | 4/2019 | Förster ................. A01K 11/006 |
| 2019/0107621 | A1* | 4/2019 | Küking ................... G01S 17/04 |
| 2019/0174723 | A1* | 6/2019 | Umegård ............. A01K 29/005 |
| 2019/0200577 | A1* | 7/2019 | Kath .................... A61B 5/6831 |
| 2020/0068853 | A1* | 3/2020 | Radovcic ......... H04M 1/72403 |
| 2020/0137984 | A1* | 5/2020 | Lammers ................. A01K 5/02 |
| 2020/0175611 | A1* | 6/2020 | Gelfand .................. G06F 16/27 |
| 2020/0202596 | A1* | 6/2020 | Kitahara ............... G06T 7/0012 |
| 2020/0337272 | A1* | 10/2020 | Kumar .................... G06F 18/28 |
| 2020/0349560 | A1* | 11/2020 | Samples ............. G06Q 20/384 |
| 2020/0396962 | A1* | 12/2020 | Wallace ............... A61D 17/002 |
| 2021/0037793 | A1* | 2/2021 | Xiao .................... A01K 29/005 |
| 2021/0045360 | A1* | 2/2021 | Harvey .................. G08B 21/18 |
| 2021/0076643 | A1* | 3/2021 | Persaud ................. G06V 10/82 |
| 2022/0155054 | A1* | 5/2022 | Humpston ................ G06T 7/62 |
| 2023/0230258 | A1* | 7/2023 | Psota ..................... G06T 7/246 |
| | | | 382/103 |

FOREIGN PATENT DOCUMENTS

| | | |
|---|---|---|
| CN | 109215347 A | 1/2019 |
| CN | 111553732 A | 8/2020 |
| JP | 2018055461 A | 4/2018 |
| WO | 2021118442 A1 | 6/2021 |

OTHER PUBLICATIONS

Written Opinion of the ISA for PCT/SE2022/050630 mailed Sep. 28, 2022, 10 pages.
Swedish Search Report for SE2130185-8 mailed Mar. 14, 2022, 3 pages.
Benaissa S. et al., "Calving and estrus detection in dairy cattle using a combination of indoor localization and accelerometer sensors", Computer and Electronics in Agriculture, Elsevier, Amsterdam, NL, vol. 168, Dec. 18, 2019, 10 pages.
Office Action, issued in Chinese Patent Application No. 202280045890.0 dated Oct. 23, 2025.

* cited by examiner

Fig. 1

SYSTEM FOR DETERMINING A WALKED DISTANCE OF AN ANIMAL WITHIN A BARN

CROSS-REFERENCE TO RELATED APPLICATIONS

This application is the US national stage of PCT/SE2022/050630, filed Jun. 23, 2022 and designating the United States, which claims the priority of SE 2130185-8, filed Jul. 1, 2021. The entire contents of each foregoing application are incorporated herein by reference.

BACKGROUND OF THE INVENTION

Field of the Invention

The invention relates to a system for determining a respective walked distance of animals in an agricultural indoor environment such as a barn for cows, during a predetermined time period.

Description of the Related Art

Dairy farms often comprise automatic milking systems, allowing the animals to stroll around freely in a dwelling area and may visit an automatic milking equipment, such as a milking robot, rotating milking parlour, etc., for milking. The animals then voluntarily go and visit the automatic milking equipment for being milked, tempted by nutrition offered at the automatic milking equipment, and/or sorted out by a gate in a forced animal traffic layout in the barn. This is sometimes also referred to as a voluntary milking system, or just robotic milking.

Herds of animals are becoming bigger and bigger. It may become a challenge for the farmer to detect and locate an exception animal, like animals predicted to be in heat (for performing insemination); as well as sick or injured animals or animals with an otherwise abnormal state or behaviour. Several attempts have been made to find solutions for this purpose, for example based on measurement and analysis of milk yield, rumination, milk composition, hormones, etc., of the respective animal. However, they all have their limitations. It may for this reason be desired to find another methodology to identify the exception animal, to be utilised alone, or in combination with other measurements.

Real-Time Location Systems (RTLS) have emerged to enable location of animals indoors, for example in the barn. The animal is provided with a tag comprising a radio transmitter transmitting radio signals, or blinks. These radio signals of the tag are received by receivers, or anchors as they also may be referred to, which are positioned at different known positions in the barn. The receivers may determine direction, angle of arrival and/or time delay of the received signals and forward this information to a positioning controller, which is calculating a set of position coordinates of the animal based on one or more signal locating algorithms, such as trilateration, multilateration, and/or triangulation of the radio signals of the tag/radio transmitter, as received by the respective receivers.

The current position of the animal may thereby be determined. However, various problems are associated with RTLS. Under ideal conditions, the previously known RTLS positioning systems has a precision of about 1-4 decimetres. However, due to reflections of radio waves, signal interference between tags of different but closely positioned animals, etc., the positioning may be considerably less precise, and/or at moments not known at all. The signalling may also be at least temporarily affected by various machines etc., temporarily placed or moving around in the barn, thereby temporarily blocking the transmitted signal of the transmitters/tags in certain locations of the barn.

Thus, signals may be lost, and/or alternatively comprise incomplete information for enabling positioning of the animal at the moment of the transmitted signal. In case only one single signal or possibly some few signals are lost and/or comprises incomplete data, the animal may be positioned by inserting an interpolated/extrapolated value. However, when several signals are lost or comprises incomplete data, a reliable positioning or tracking of the animal cannot be made at all according to previously known solutions.

SUMMARY OF THE INVENTION

It is an object of the present invention to enable a reliable positioning and tracking of an animal in a barn, and also enable detection of an exception animal.

This object is achieved by a system according to claim 1. In particular, the system aims at determining a respective walked distance of animals within a barn during a predetermined time period, wherein a tag is associated with each animal. The system comprises a processing controller and a database. The database is configured to store historical trajectories of the animals, associated with the respective animal. The historical trajectories may for example be associated with a tag identity stored in the tag carried by the animal. The system also comprises a positioning controller.

The mentioned tag comprises a processing device, a radio transmitter and a memory. The memory stores a tag identity i.e., a code which is uniquely identifying the tag. The tag is in turn associated with an animal identity of the animal associated with/carrying the tag, for example in a look-up table or in the database. The processing device is configured to transmit a radio signal via the radio transmitter, repeatedly at a regular time interval; wherein each radio signal comprises the tag identity.

The regular time interval between radio signal transmissions may be for example about every 2.2 seconds. Other regular time intervals such as every 2 seconds, every 3 seconds, etc., may be applied in other embodiments.

The system also comprises at least three receivers, positioned at a respective predetermined position in the barn. The receivers, or anchors, are each one configured to receive the transmitted radio signals and communicate information related to the received radio signals to the positioning controller. The communicated information may comprise for example a measured angle of arrival of the received signal, a measured signal strength of the received signal and/or a time of arrival/delay time of the received signal.

The positioning controller is configured to repeatedly obtain the information related to the received radio signals, received from the respective receivers, for each tag identity. The positioning controller then calculates a set of position coordinates of the tag comprising the respective tag identity based on the information related to the received radio signals of the radio transmitter received by the receivers. The positioning controller is also configured to provide data entities, each data entity comprising the calculated position coordinates of the tag associated with a timestamp and/or an index number to the processing controller.

The processing controller is configured to determine the walked distance of the animal by estimating a walked trajectory during the predetermined time period. The walked distance is determined by establishing the walked trajectory based on the obtained data entities, and storing the established walked trajectory in the database associated with the animal, in case no gap exceeding a threshold time, of a plurality of missing or incomplete data entities in sequence among the obtained data entities is detected.

When a gap exceeding the threshold time, of a plurality of missing or incomplete data entities in sequence among the obtained data entities is detected, the walked distance is determined by establishing the walked trajectory by inserting a replacement distance data in the detected gap exceeding the threshold time, of a plurality of missing or incomplete data entities in sequence among the obtained data entities, based on historical trajectories extracted from the database and store the established walked trajectory in the database associated with the animal. The length of the established walked trajectory is thereby determined to be the walked distance of the animal.

Thanks to the replacement distance data inserted in the detected gap exceeding the threshold time, of a plurality of missing or incomplete data entities in sequence among the obtained data entities, the trajectory of the animal is reconstructed, based on stored movement trajectories of the same and/or other animals in the barn. Typical movement patterns of the animal, or preferred movements/placements within the barn of the animal may be simulated for the sequences of data entities for which the gap exceeding the threshold time, of a plurality of missing or incomplete data entities in sequence among the obtained data entities has been detected, leading to an improved simulation of the animal movement pattern which better estimates the actually walked distance of the animal in the barn than previously known solutions. A robust and more precise estimation of the walked distance of the animal is thereby achieved, also when the signals of the animal tag have been blocked, distorted or reflected during one or several time gaps exceeding the threshold time, of a plurality of missing or incomplete data entities in sequence among the obtained data entities.

In embodiments of the invention, the processing controller may be configured to, when the gap exceeding the threshold time, of a plurality of missing or incomplete data entities in sequence among the obtained data entities is detected, determine an area of the barn wherein the gap exceeding the threshold time, of a plurality of missing or incomplete data entities in sequence among the obtained data entities is detected. Also, the processing controller may determine a segment of the historical trajectories associated with position coordinates within the area. The processing controller may also obtain the replacement distance data based on the determined segment of the historical trajectories in the area.

By dividing the barn into different areas and store segments of the historical trajectories associated with position coordinates within the area, a usually applied movement pattern of the animal in different areas of the barn may be extracted from the database. This stored movement patterns may be used for reconstructing the current trajectory of the animal during the gap wherein no data entities are available. A reality-simulating reconstruction of lost or defect/incomplete data entities of the animal is thereby enabled, assuming that the involved animals are creatures of habit, often repeating the same movement pattern, and/or using the same passages during transportation within the barn.

The processing controller may also obtain the replacement distance data by calculating an average of segments of the historical trajectories associated with position coordinates within the area.

By calculating an average value of the segments of the historical trajectories, minor deviations of trajectory segments over time may be evened out, leading to reliable replacement distance data.

The historical trajectories extracted from the database may relate to the same individual animal, thereby exploiting the individual movement habits of the particular animal. The individual animal may prefer resting in a certain cubicle in the barn, walk to a certain section of the fodder table, stroll around socialising with other animals, take the same way to the milking robot, etc., in a pattern that is fairly repetitive. By replacing a missing part of the positioning data of the animal with replacement distance data of, or based on, previously stored trajectories of the same animal, it is possible to recreate the walking trajectory of the animal, also when relatively large portions of data entities are missing. Thereby a realistic recreation of the walking trajectory of the animal, which is simulating the actually walked distance of the animal, is achieved.

However, in other embodiments, the historical trajectories may be related to a plurality of animals in the barn. Thereby, historical trajectories are obtained, also for an animal which has recently arrived at the barn and thereby has no historical trajectories associated with the individual animal.

The database may comprise a virtual representation of the barn wherein walls and movement restrictions such as cubicles, feeding table etc., have a corresponding virtual restriction with corresponding positions in the virtual representation. The replacement distance data may be inserted in the detected gap exceeding the threshold time, of a plurality of missing or incomplete data entities in sequence among the obtained data entities, based on knowledge about positions of movement restrictions in the barn, extracted from the database.

It could be assumed that the animal impossibly can walk through walls, cubicles, feeding tables, fences etc., in/of the barn. By reconstructing the walked trajectory of the animal with regard to the known movement restrictions of the barn, it is avoided that replacement distance data is introduced in a simulated walked trajectory that is impossible for the animal to actually pass. A more likely and reliable walked trajectory of the animal is thereby achieved.

The processing controller is configured to determine a segment of the movement restrictions corresponding with the area of the barn wherein the gap exceeding the threshold time, of a plurality of missing or incomplete data entities in sequence among the obtained data entities is detected and obtain the replacement distance data based on the determined segment of the movement restrictions in the area. Reconstruction of the walked trajectory is thereby improved.

The determined walked distance of the animal may be compared with a threshold walked distance. It may be concluded that the animal is in heat when the threshold walked distance is exceeded. The threshold walked distance may be individual for each particular animal at the farm, thereby enabling reliable heat detection of the animal. By detecting heat, the animal may be inseminated at a correct moment in time.

The radio transmitter of the animal tag is configured to transmit a radio signal in an Ultra-Wide Band, leading to a precise positioning of the animal within the barn.

The threshold length of the gap exceeding the threshold time, of a plurality of missing or incomplete data entities in sequence among the obtained data entities corresponds to at least 10 seconds, such as for example 15 seconds, about at least 20-30 seconds, etc. Minor gaps, i.e. shorter than the threshold time of a plurality of missing or incomplete data entities in sequence among the obtained data entities, may be amended by means of interpolation or extrapolation of surrounding/preceding data entities.

The system may comprise an output device such as a portable computer, mobile phone, tablet, screen, etc., on which a representation of the determined walked distance of the animal on the output device may be output in some embodiments.

BRIEF DESCRIPTION OF THE DRAWINGS

The invention will subsequently be explained further with reference to non-limiting embodiments, as schematically shown and described in the appended drawings, in which:

FIG. 1 illustrates an example of a barn interior comprising a system, according to an embodiment of the invention;

DETAILED DESCRIPTION

Figure 1:
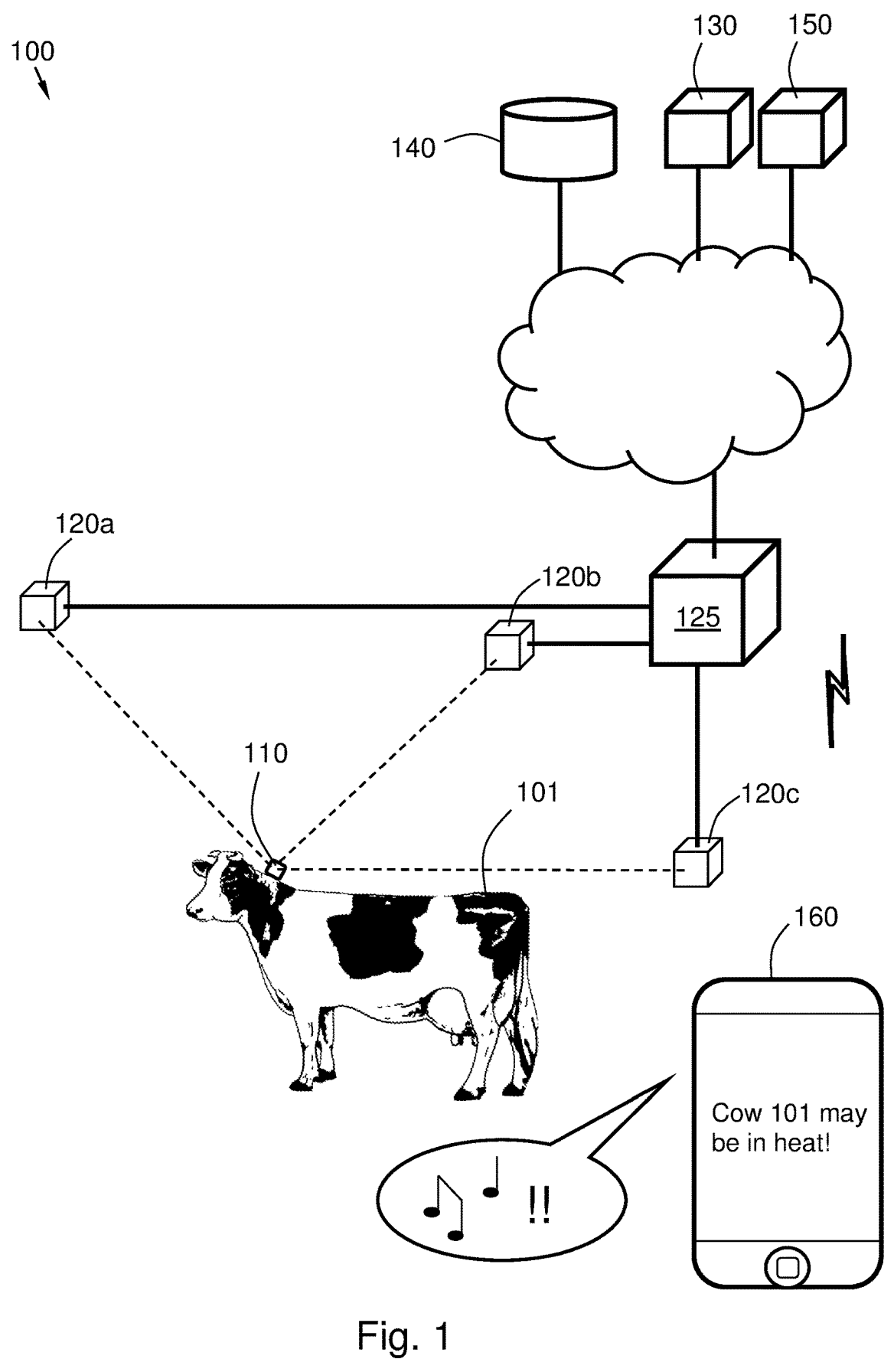

FIG. 1 is an illustration depicting an example of a barn interior comprising a system 100, according to an embodiment of the invention. An animal 101 is associated with a tag 110, comprising a radio transmitter which repeatedly, for example at a regular time interval is transmitting a radio signal, or blink; for example about every 2.2 seconds.

The animal 101 may be a cow as illustrated in FIG. 1, but may in other examples be any arbitrary domesticated animal, such as for example bull, horse, goat, sheep, camel, dairy buffalo, yak, etc.

Figure 5:
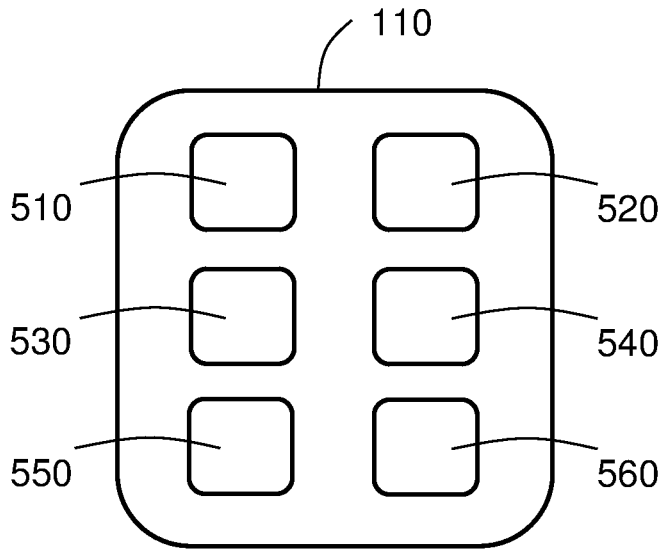
FIG. 5 illustrates a tag comprising various entities in an embodiment.

The tag 110 is attached to a body part of the animal 101, such as around the neck or pierced in one of the ears of the animal 101, or possibly any other body part. The tag 110 may have a memory which may comprise information/data uniquely identifying the tag and/or the animal 101, i.e. an identity reference such as a locally or globally unique number, name, and/or code, etc. Details of the tag 110 and various components comprised therein are illustrated in FIG. 5 and discussed in the corresponding section of the description.

The transmitter of the tag 110 emits wireless signals which may be received by a positioning controller 130 via a number of receivers 120a, 120b, 120c, such as typically at least three receivers 120a, 120b, 120c. These receivers 120a, 120b, 120c, or anchors, are mounted in the barn at predetermined, known positions, which are distinct from each other.

The wireless signals may be transmitted between the transmitter of the tag 110 and the wireless signal receivers 120a, 120b, 120c via any convenient wireless communication technology such as Ultra-Wide Band (UWB), Bluetooth (BT), Wireless Universal Serial Bus (Wireless USB), Radio-Frequency Identification (RFID), Wi-Fi, etc.; hereby the location of the tag 110, and thereby indirectly of the animal 101 associated with the tag 110 may be determined.

Wireless signalling based on UWB may provide certain advantages and a more detailed positioning of the tag 110/animal 101 may be made, in comparison with alternative radio band solutions.

Upon repeatedly receiving the data related to the received radio signals, received from the respective receivers 120a, 120b, 120c, possibly via a gateway 125, the positioning controller 130 is configured to based on the tag identity, calculate a set of position coordinates of the tag 110 comprising the respective tag identity based on the information related to the received radio signals of the radio transmitter received by the receivers 120a, 120b, 120c.

The positioning controller 130 may determine position of the tag 110, based on signals transmitted by the tag 110. The location of the tag 110 (and thereby also of the associated animal 101) may be made e.g. via triangulation or trilateration in at least two directions, e.g. two perpendicular directions such as X and Y.

Each data entity composed by the positioning controller 130 may comprise, or at least be configured to comprise, a timestamp, a tag identity, a blink index number, an X coordinate, an Y coordinate, a Z coordinate, and/or accelerometer data.

In an ideal situation, the receivers 120a, 120b, 120c may receive every blink of the tag 110, thereby enabling the positioning controller 130 to continuously determine the position of the tag 110. However, a blink may not be received by one, some or all of the receivers 120a, 120b, 120c, thereby producing a gap in the series of blinks.

Sometimes, the received blink may be distorted or disturbed by interference with other signals or signal reflections by obstacles in the barn, which affect positioning of the tag 110/animal 101.

The positioning controller 130 is configured to provide data entities, each data entity comprising the calculated position coordinates associated with the tag identity, a timestamp and/or an index number to a processing controller 150 and/or a database 140.

The computational functions of the provided system 100 has in the illustrated example been divided between one positioning controller 130 and one processing controller 150, which are physically separated both from each other and from the farm. In other embodiments however, the computational functions of both the positioning controller 130 and the processing controller 150 may be performed by one single controller, which may be situated at the farm, or remotely therefrom while communicationally connected. In yet other embodiments, the described computing functions of the positioning controller 130 and the processing controller 150 may be sub divided into additional controllers, which may be communicationally connected with each other, thereby enabled to perform the computations of the system 100. The processing controller 150 and/or the database 140 may be remotely situated in relation to the farm, connected to the positioning controller 130/RTLS via a wired or wireless network in some embodiments. Thereby, data processing, calculations and data storage may be made centrally, which saves resources and spare the farmer from data maintenance, software updates, etc.

Alternatively, the processing controller 150 and/or the database 140 may be locally situated at the farm. Thereby a solution is achieved, which is independent in relation to network connection functionality.

The collected data may thereby be obtained and analysed by the processing controller 150, for example by controlling the obtained data entities during a predetermined time period and detect a gap exceeding a threshold time, of a plurality of missing or incomplete data entities in sequence among the obtained data entities, associated with the same tag identity. The threshold time may be for example 10 seconds. The processing controller 150 may for example control the respective associated time stamp of the obtained data entities, thereby detecting missing data entities in sequence exceeding the threshold time. The processing controller 150 may for example control that data entities comprises complete data/position coordinates and based on the respective associated time stamp of the obtained incomplete data entities, detect incomplete data entities in sequence exceeding the threshold time. The processing controller 150 may for example extract a respective index number of each obtained complete data entity, compare them with each other and thereby, based on detected missing index numbers in sequence in addition to knowledge of the regular time interval of the tag blinks, detect the gap exceeding the threshold time, of a plurality of missing or incomplete data entities in sequence among the obtained data entities.

Data entities not comprising position coordinates (X/Y and possibly Z), or at least not complete position coordinates may be eliminated.

In an example, analysis of the obtained data entities may result in filtering and removal of outlier positions.

The processing controller 150 may then determine the walked distance of the animal 101 by estimating a walked trajectory of the animal 101 during the predetermined time period, by establishing the walked trajectory based on the obtained data entities.

The established walked trajectory is then stored in the database 140 associated with the identity reference of the animal 101, in case no gap exceeding the threshold time, of a plurality of missing or incomplete data entities in sequence among the obtained data entities is detected.

The threshold time of the gap may be for example at least 10 seconds, 12 seconds, 15 seconds, 20 seconds, etc., i.e., comprising a plurality of data entities in a sequence. For short gaps smaller than the threshold time, comprising only one data entity or possibly some few data entities, an interpolation may be made based on the preceding and the subsequent data entities.

However, when a gap exceeding the threshold time, of a plurality of missing or incomplete data entities in sequence among the obtained data entities is detected, interpolation does not present a sufficiently reliable methodology for enable calculation of the walked distance of the animal 101. Instead, the walked trajectory is established by inserting a replacement distance data in the detected gap, based on historical trajectories extracted from the database 140. The established walked trajectory is then stored in the database 140 associated with the animal 101.

In some embodiment, the determined walked distance of the animal 101 may be compared with a heat threshold limit. It may then be concluded that the animal 101 is in heat when the heat threshold limit is exceeded. The heat threshold limit may be for example a 10% increase over an average walked distance of that animal 101 during the time period.

The system 100 may comprise an output device 160, for example a portable/stationary display of the farmer. Information concerning the animal 101 may be output on the output device 160, for example concerning whether the animal 101 is in heat and/or a representation of the walked trajectory of the animal 101.

Figure 2:
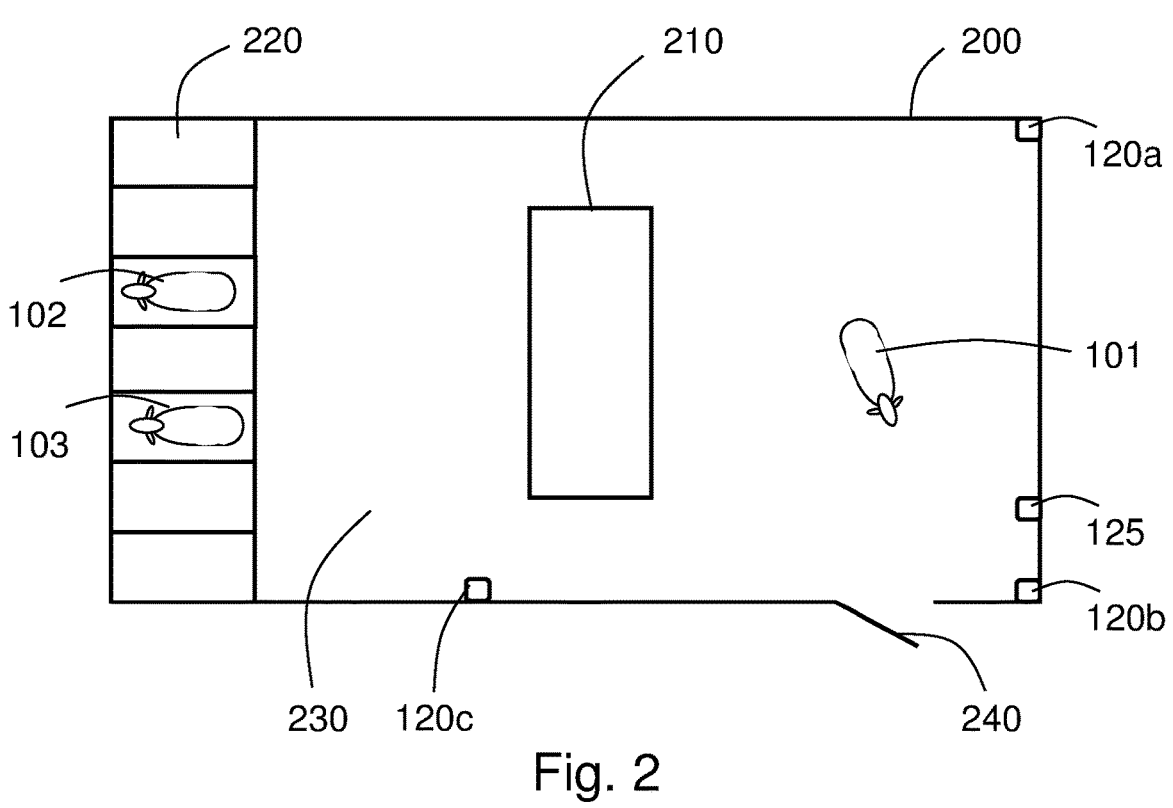
FIG. 2 illustrates an overview image of a barn according to an embodiment.

FIG. 2 illustrates an overview of a barn 200 in a possible embodiment, wherein the signal receivers 120a, 120b, 120c may be situated, for receiving radio signals transmitted by the tag 110 of the respective animals 101, 102, 103.

The barn 200 may comprise various zones dedicated for different purposes, such as for example a feed table 210 for eating, cubicles 220 for resting, and a walking zone 230 for transportation and strolling around. In this case, the barn also has a door 240, where the animals 101, 102, 103 may exit the barn 200, for example to a meadow field, for outdoor recreation.

In other barns 200, there may be one or more of a water dispenser zone, a brush zone, a milking robot zone, a waiting zone for accessing the milking robot, a milking zone, multiple entrances/exit zones, etc.

Figure 3:
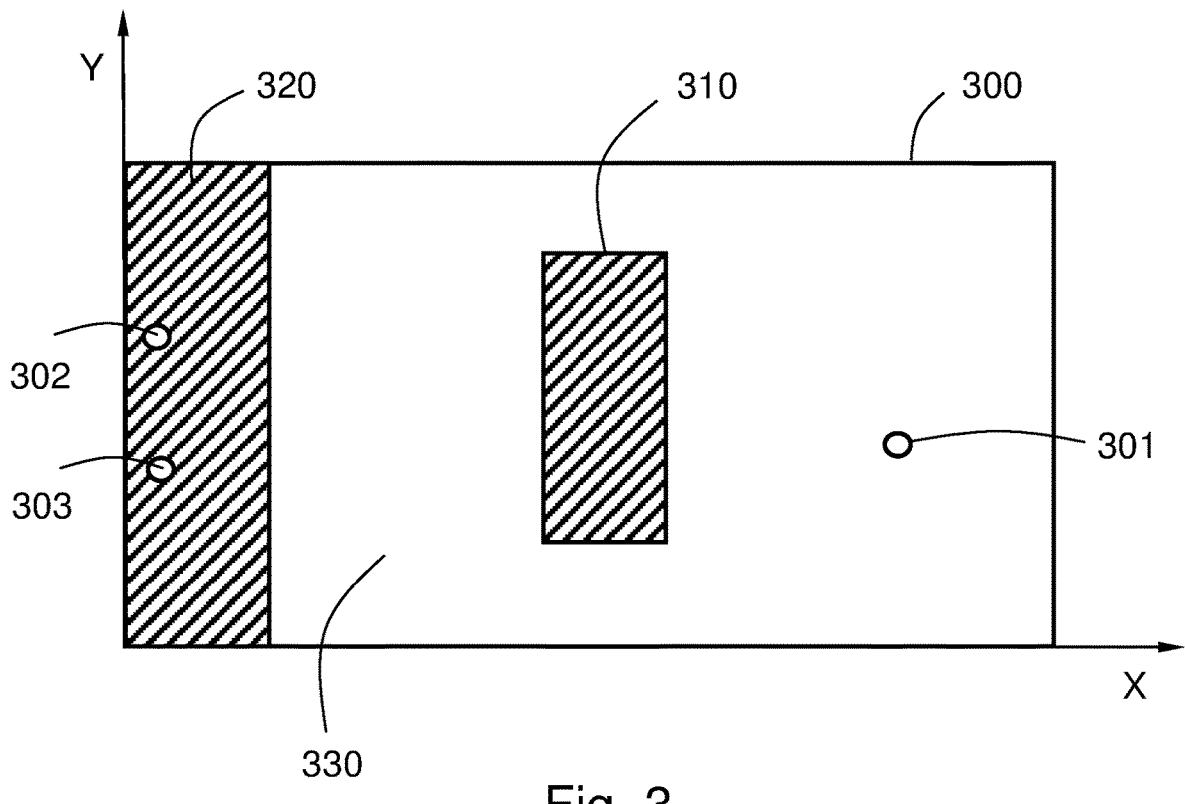
FIG. 3 illustrates a virtual map of the barn according to an embodiment.

FIG. 3 illustrates a virtual representation 300 of the barn 200 comprising position coordinates of movement restrictions 310, 320, 330 in the barn 200. The position coordinates of movement restrictions 310, 320, 330 corresponds with walls and other limitations which are obstructing animal passage, of the barn 200.

The current position of the respective animal 101, 102, 103 may be represented by a respective data entity 301, 302, 303 comprising an X and a Y coordinate each, besides other data as already mentioned.

Figure 4A:
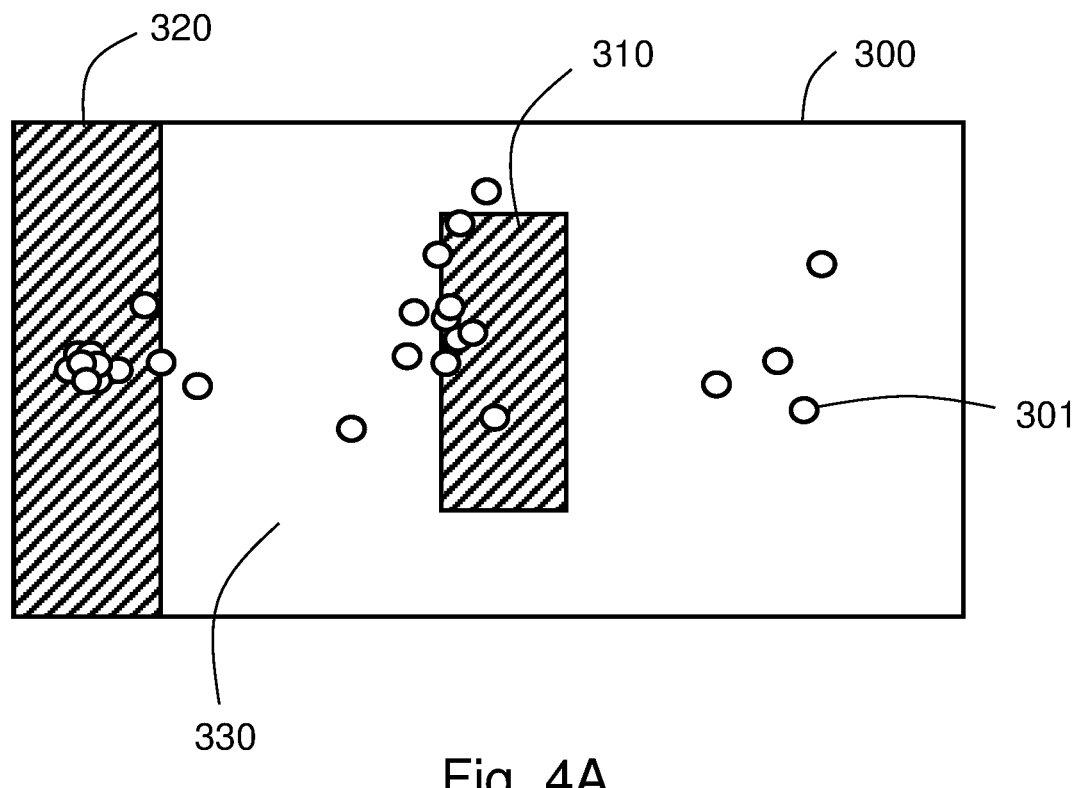
FIG. 4A-G illustrates a track sequence of information entities in a virtual map of the barn according to different embodiments.

FIG. 4A schematically illustrates data entities 301 of one particular animal 101, which have been captured during a predetermined time period, for example about 10-20 minutes.

It is desired to determine the walked distance of the animal 101 within the barn 200 during the predetermined time period.

Figure 4B:
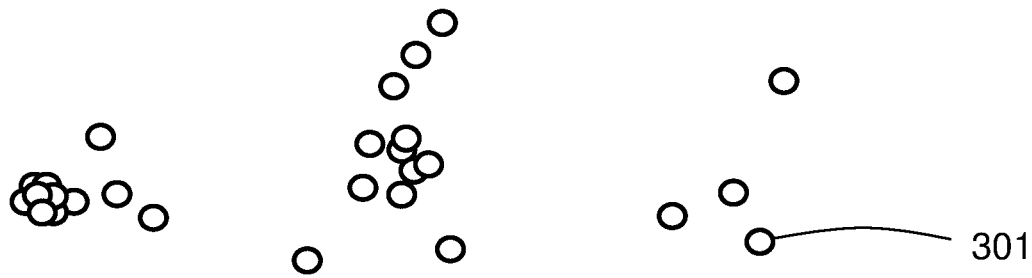

FIG. 4B schematically illustrates data entities 301 of one particular animal 101. By controlling whether a gap exists, exceeding the threshold time, of a plurality of missing or incomplete data entities 301 in sequence among the obtained data entities 301, based on index number, and/or timestamp, a reconstruction of the walked trajectory of the animal 101 during the predetermined time period is enabled.

Figure 4C:
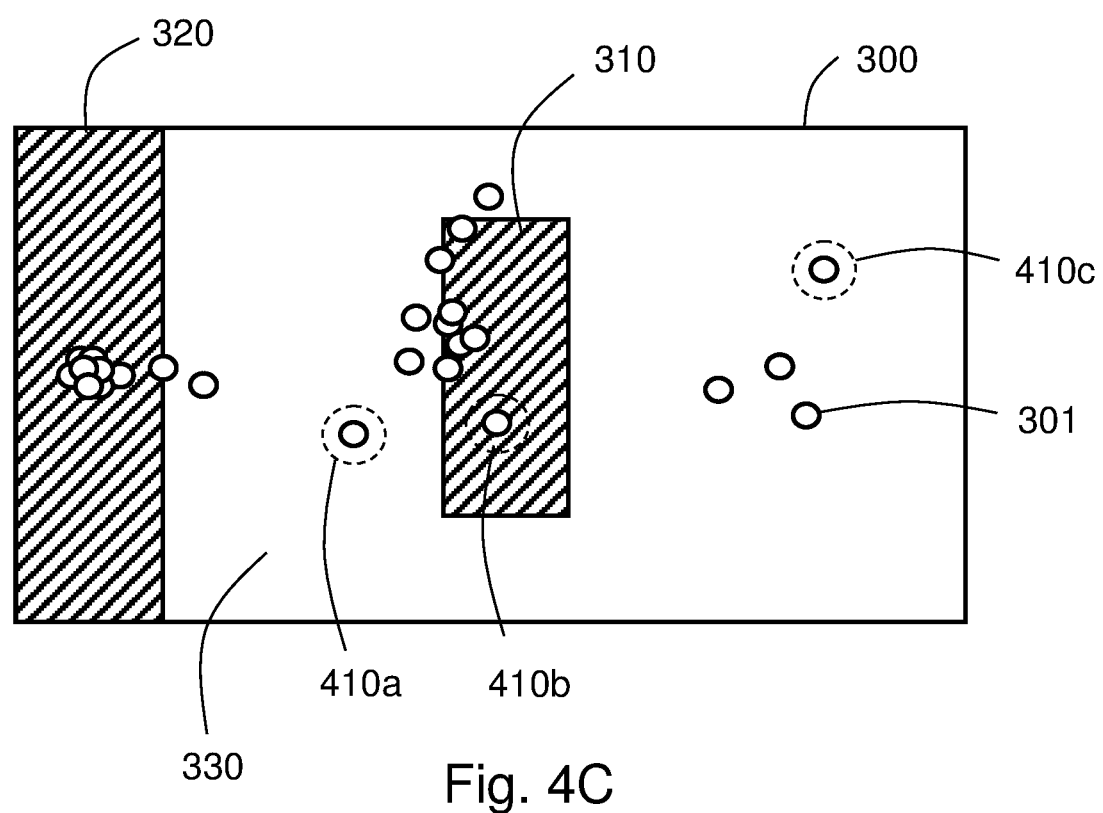

FIG. 4C schematically illustrates an example of data entities 301 obtained from the positioning controller 130, wherein outlier data entities 410a, 410b, 410c may be filtered out and deleted according to some different principles or methodologies.

The identification and removal of the detected outliers 410a, 410b, 410c may be an iterative process, based on velocity calculations of animal velocity between successive data entities 301.

An algorithm for calculating the animal velocity may comprise firstly calculating dx, dy and dt for all data entities 301 and then calculate: $v=sqrt\ (dx^2+dy^2)/dt$.

Thereafter, the position having the highest velocity may be deleted, and the velocities for the remaining data entities 301 in the array 400 may be recalculated, as long as the maximum velocity >2000 mm/s (2 m/s or 7.2 km/h), when the animal 101 is a cow. Other kinds of animals may have other velocity threshold limits.

Based on velocity distributions from these computations, it may be assumed to be very unlikely that a cow moves faster than 2 m/s, why data entities 301 involving a faster velocity than 2 m/s may be deleted. Sometimes also the data entity 301 before the one having a large velocity may be removed.

Figure 4D:
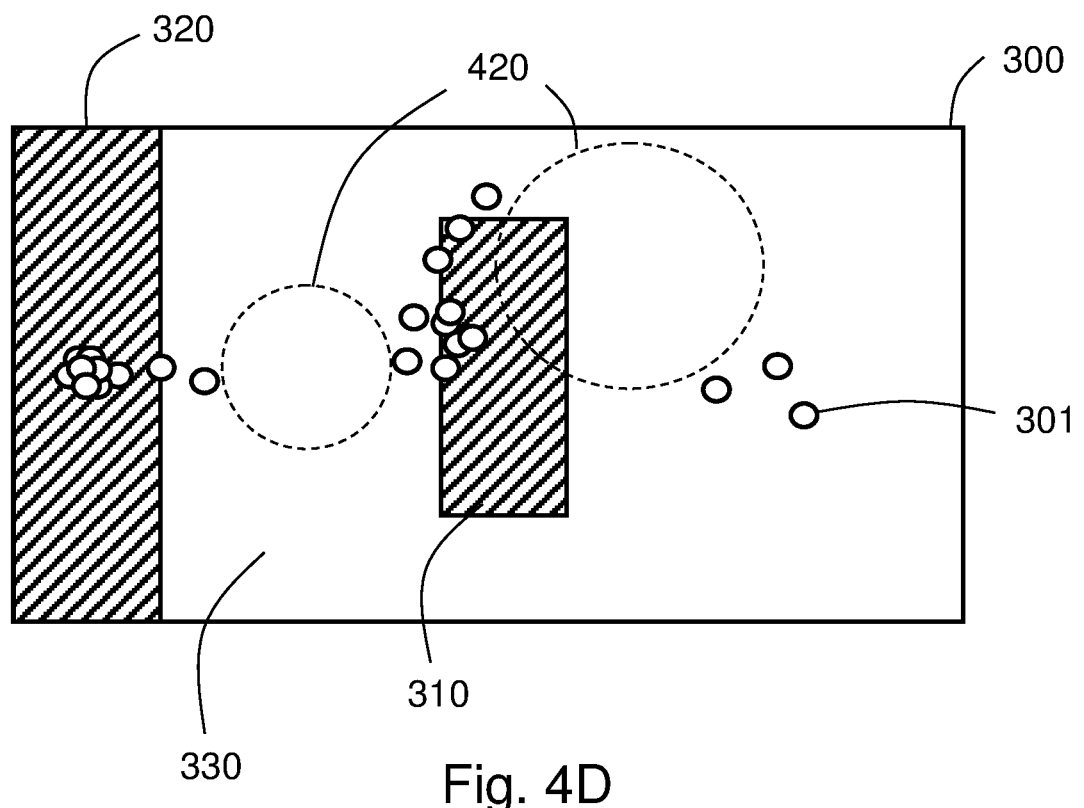

For larger gaps 420 exceeding the threshold time, of a plurality of missing or incomplete data entities 301 in sequence among the obtained data entities 301, as illustrated in FIG. 4D, the whereabouts of the animal 101 becomes more uncertain, and the walked trajectory of the animal 101 has to be reconstructed in another way than entrusting conventional interpolation/extrapolation solutions.

Figure 4E:
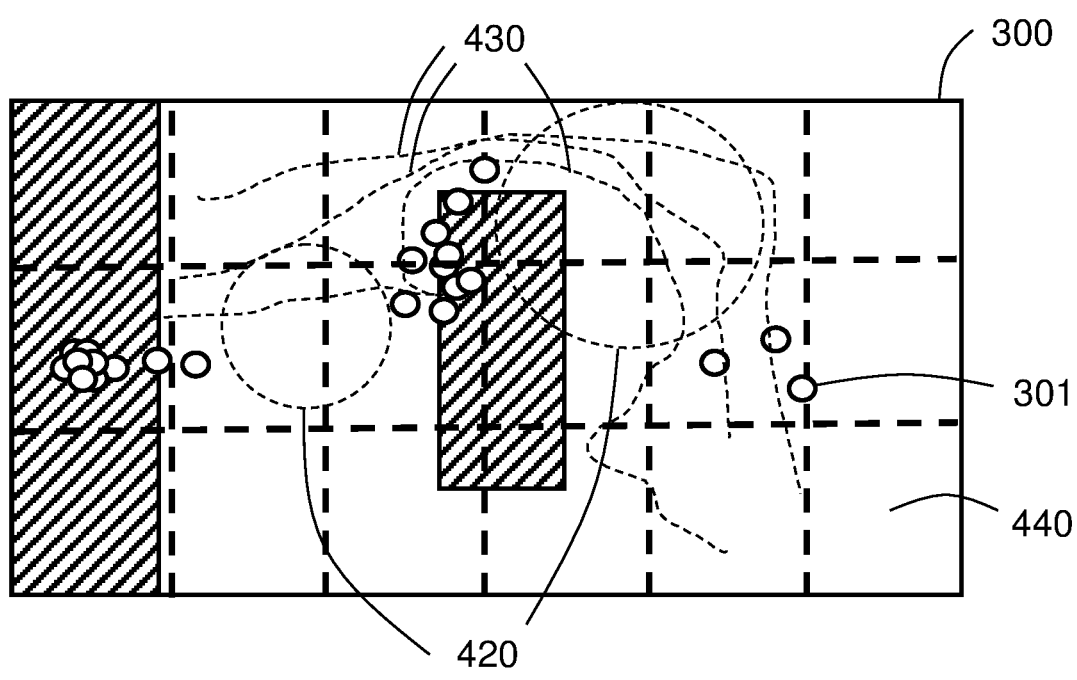

FIG. 4E illustrates a number of historical trajectories 430 of the animals 101, 102, 103, associated with a respective animal 101, 102, 103, wherein each historical trajectory 430 comprises position coordinates.

Also, the virtual representation 300 of the barn 200 may be divided into a number of distinct areas 440, not to be confused with the before-mentioned zones 210, 220, 230 of the barn 200.

The size of each area 440 may be equal, or different in different implementations. An advantage of having equally size areas 440 is that implementation becomes easy. In some examples, the size of the areas 440 may be different, i.e. some areas which are regarded as in particular critical may be divided into smaller areas 440, while less critical areas 440 may be larger. An example of area size may be 4×4 metres; however, this is merely a non-limiting example and may depend for example on the size of the barn 200, number of animals in the barn 200, etc.

Figure 4F:
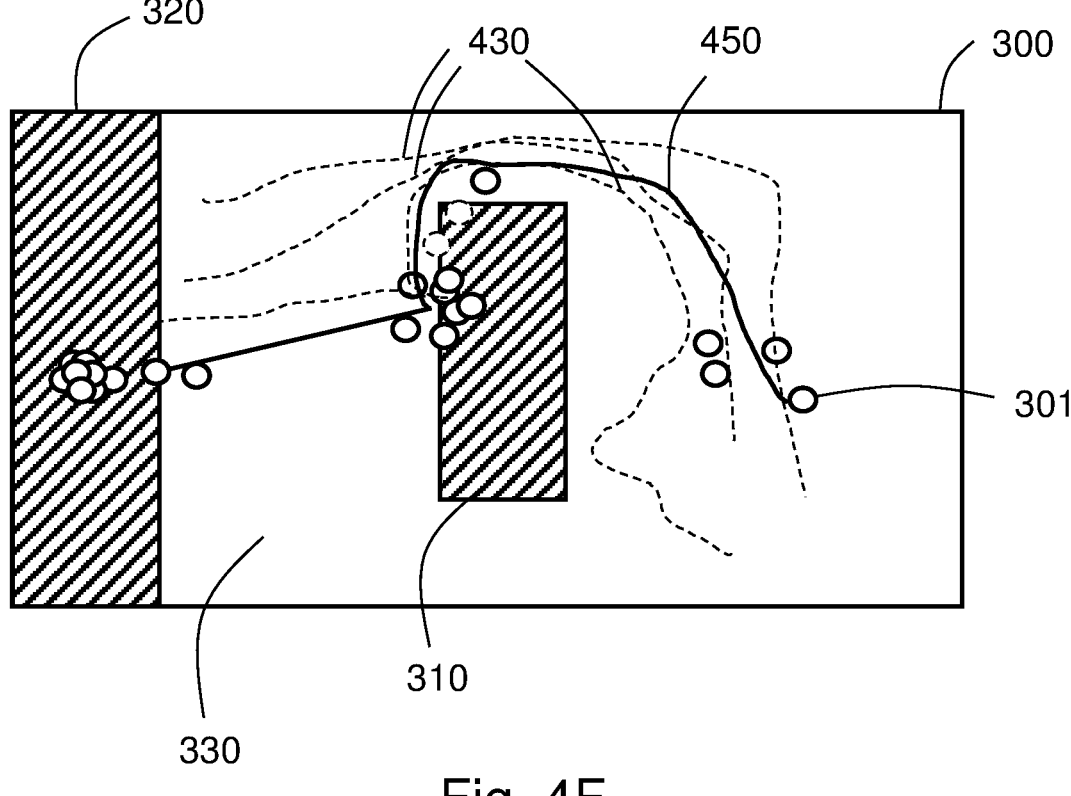

A walked trajectory 450 of the animal 101 may then be established, as illustrated in FIG. 4F, by inserting a replacement distance data in the detected gap 420 exceeding the threshold time, of a plurality of missing or incomplete data entities 301 in sequence among the obtained data entities 301, based on historical trajectories 430 extracted from the database 140.

The replacement distance data may in embodiments be obtained by determine the area 440 of the barn 200 wherein the gap 420 exceeding the threshold time, of a plurality of missing or incomplete data entities 301 in sequence among the obtained data entities 301 is detected. A segment of the historical trajectories 430 associated with position coordinates within the area 440 may be determined and the replacement distance data may be obtained based there upon.

The established walked trajectory 450 may then be stored in the database 140 associated with the animal 101, and possibly also with an area 440 and/or a timestamp.

An advantage with storing the trajectories 450 in the database 140 with a timestamp is that aging is enabled; trajectories 450 older than a threshold age, for example one month, one week, two days, some hours, etc., may be deleted. Thereby, the oldest of the stored/historical trajectories 430, 450 in the database 140 may continuously be deleted, which reduces the amount of data stored in the database 140. Also, the stored/historical trajectories 430, 450 may be adapted to reflect recent movement patterns of the animals 101, 102, 103.

Figure 4G:
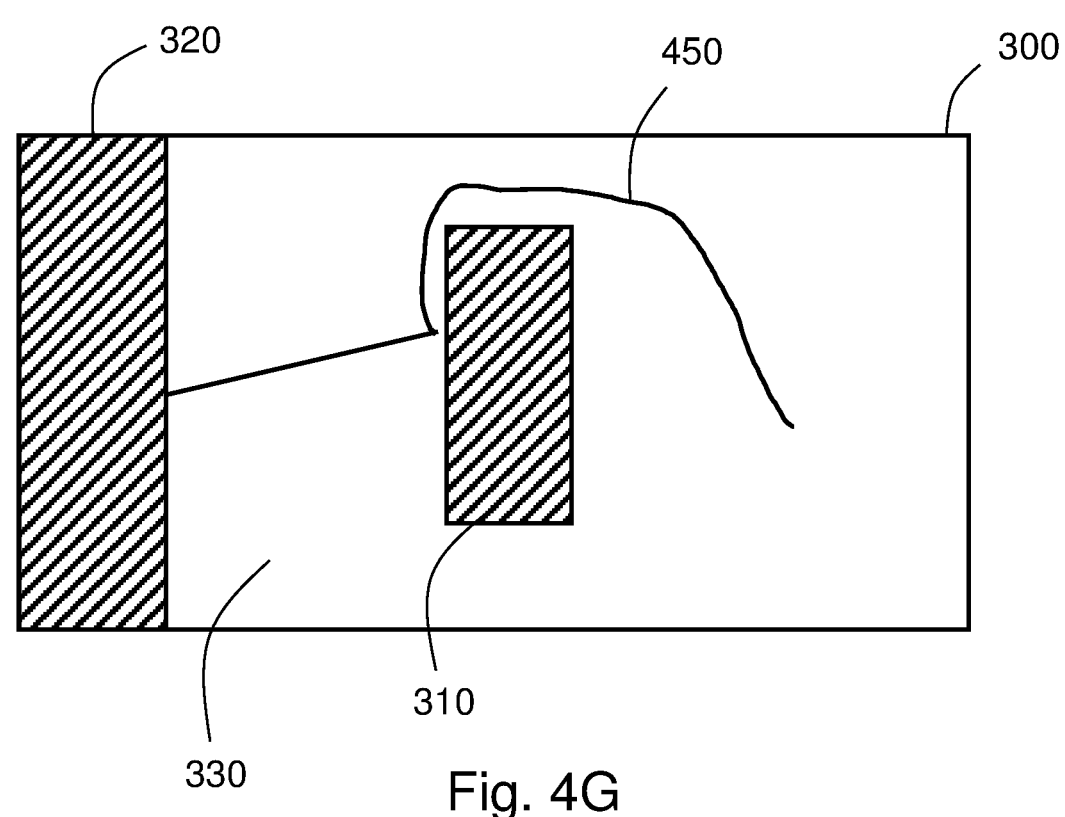

FIG. 4G schematically illustrates the established walked trajectory 450 of the animal 101 during the predetermined time period. By measuring the length of the walked trajectory 450, the walked distance of the animal 101 is determined.

After having determined the walked distance of the animal 101, the established walked trajectory 450 may be stored in the database 140, associated with the animal 101 and possibly also a timestamp, thereby forming part of historical trajectories 430 of the animal 101.

FIG. 5 illustrates a tag 110, as carried or associated with the animal 101. The tag 110 comprises a processing device 510, a radio transmitter 520 and a memory 530. The memory 530 stores a tag identity unique for the tag 110. The processing device 510 is configured to transmit a radio signal, or blinks, via the radio transmitter 520, repeatedly at a regular time interval such as every 2.2 seconds or there about. Each radio signal comprises the tag identity. The transmitted radio signals may be a radio signal in an Ultra-Wide Band, in an example.

The tag 110 may in some optional embodiments also comprise a device 540 for determining activity of the animal 101, such as e.g. one or several 3-Dimensional (3D) accelerometer, a giro, inertia sensor, etc.

The optional 3D accelerometer 540 of the tag 110 may perform high frequency recordings of tri-axial acceleration, which allows for discrimination of behavioural patterns like determining whether the animal 101 is ruminating or eating for example.

The memory 530 stores a tag identity and/or an identity reference of the animal 101.

The tag 110 may in some embodiments comprise a receiver 550, configured to receive radio signals. Other entities such as for example the positioning controller 130 and/or the processing controller 150 may communicate commands via a respective associated transmitter, for example to trigger the tag 110 to transmit a signal.

The tag 110 may also comprise an energy source 560, such as a battery, providing energy to the other enumerated entities comprised in the tag 110.

The invention claimed is:

1. A system (100) for determining a respective walked distance of animals (101, 102, 103) within a barn (200) during a predetermined time period, the barn being divided into a plurality of areas, the system (100) comprising:

a tag (110) associated with each of the animals (101, 102, 103), each said tag (110) comprising:

a memory (530) storing a tag identity;

a radio transmitter (520); and a processing device (510) configured to transmit a radio signal via the radio transmitter (520), repeatedly at a regular time interval; wherein each said radio signal comprises the tag identity;

a processing controller (150);

a database (140), comprising historical trajectories (430) of the animals (101, 102, 103), associated with respective said animals (101, 102, 103), wherein each of the historical trajectories (430) comprises position coordinates;

a positioning controller (130); and at least three receivers (120a, 120b, 120c), each of the receivers positioned at a respective predetermined position in the barn (200), each of the receivers configured to:

receive the transmitted radio signals; and communicate information related to the received radio signals with the positioning controller (130);

wherein the positioning controller (130) is configured to repeatedly:

obtain the information related to the received radio signals, received from the respective receivers (120a, 120b, 120c), for each said tag identity;

calculate a set of said position coordinates of the tag (110) comprising the respective said tag identity based on the information related to the received radio signals of the radio transmitter (520) received by the receivers (120a, 120b, 120c);

provide data entities (301), each data entity (301) comprising the calculated position coordinates of the tag (110) associated with a timestamp and/or an index number to the processing controller (150); and wherein the processing controller (150) is configured to:

determine the walked distance of a given said animal (101) associated with the tag (110) comprising the tag identity by estimating a walked trajectory (450) during the predetermined time period, by:

detecting whether a gap (420) exceeding a threshold time, of a plurality of missing or incomplete said data entities (301) in sequence among the obtained data entities (301) exists;

if the gap is not detected, establishing the walked trajectory (450) based on the obtained data entities (301), and storing the established walked trajectory (450) in the database (140) associated with the given said animal (101), if the gap is detected, establishing the walked trajectory (450) by inserting a replacement distance data in the detected gap (420) exceeding the threshold time, of a plurality of the missing or incomplete data entities (301) in sequence among the obtained data entities (301), by determining an area (440) of the barn (200) wherein the gap (420) exceeding the threshold time, of a plurality of the missing or incomplete data entities (301) in sequence among the obtained data entities (301) is detected;

determining a segment of the historical trajectories (430) associated with said position coordinates within the area (440); and obtaining the replacement distance data based on the determined segment of the historical trajectories (430) in the area (440); and storing the established walked trajectory (450) in the database (140) associated with the given said animal (101); wherein a length of the established walked trajectory (450) is determined to be the walked distance of the given said animal (101).

2. The system (100) according to claim 1, wherein the processing controller (150) is configured to:

obtain the replacement distance data by calculating an average of segments of the historical trajectories (430) associated with said position coordinates within the area (440).

3. The system (100) according to claim 1, wherein the historical trajectories (430) extracted from the database (140) relates to the same individual animal (101).

4. The system (100) according to claim 1, wherein the historical trajectories (430) extracted from the database (140) relates to a plurality of said animals (101, 102, 103) in the barn (200).

5. The system (100) according to claim 1, wherein the barn is configured with walls and movement restrictions, wherein the database (140) comprises a virtual representation (300) of the barn (200) wherein the walls and movement restrictions (210, 220, 230) of the barn (200) have a corresponding virtual restriction (310, 320, 330) with corresponding positions; and wherein the processing controller (150) is configured to insert the replacement distance data in the detected gap (420) exceeding the threshold time, of a plurality of the missing or incomplete data entities (301) in sequence among the obtained data entities (301), based on knowledge about positions of movement restrictions (210, 220, 230) in the barn (200), extracted from database (140).

6. The system (100) according to claim 5, wherein processing controller (150) is configured to, when the gap (420) exceeding the threshold time, of a plurality of the missing or incomplete data entities (301) in sequence among the obtained data entities (301) is detected:

determine a segment of the movement restrictions (310, 320, 330) corresponding with the area (440) of the barn (200) wherein the gap (420) exceeding the threshold time, of a plurality of the missing or incomplete data entities (301) in sequence among the obtained data entities (301) is detected; and obtain the replacement distance data based on the determined segment of the movement restrictions (310, 320, 330) in the area (440).

7. The system (100) according to claim 1, wherein the processing controller (150) is configured to:

compare the determined walked distance of the animal (101) with a threshold walked distance and conclude that the animal (101) is in heat when the threshold walked distance is exceeded.

8. The system (100) according to claim 1, wherein the radio transmitter (520) is configured to transmit the radio signal in an Ultra-Wide Band.

9. The system (100) according to claim 1, wherein the threshold length of the gap (420) exceeding the threshold time, of a plurality of the missing or incomplete data entities (301) in sequence among the obtained data entities (301) corresponds to at least 10 seconds.

10. The system (100) according to claim 1, further comprising an output device (160); and wherein the processing controller (150) is configured to:

output a representation of the determined walked distance of the animal (101) on the output device (160).

11. A system (100) for determining a respective walked distance of animals (101, 102, 103) within a barn (200) during a predetermined time period, the barn being configured with walls and movement restrictions, the system (100) comprising:

a tag (110) associated with each of the animals (101, 102, 103), each said tag (110) comprising:

a memory (530) storing a tag identity;

a radio transmitter (520); and a processing device (510) configured to transmit a radio signal via the radio transmitter (520), repeatedly at a regular time interval; wherein each said radio signal comprises the tag identity;

a processing controller (150);

a database (140), comprising historical trajectories (430) of the animals (101, 102, 103), associated with respective said animals (101, 102, 103), wherein each of the historical trajectories (430) comprises position coordinates;

a positioning controller (130); and at least three receivers (120a, 120b, 120c), each of the receivers positioned at a respective predetermined position in the barn (200), each of the receivers configured to:

receive the transmitted radio signals; and communicate information related to the received radio signals with the positioning controller (130);

wherein the positioning controller (130) is configured to repeatedly:

obtain the information related to the received radio signals, received from the respective receivers (120a, 120b, 120c), for each said tag identity;

calculate a set of said position coordinates of the tag (110) comprising the respective said tag identity based on the information related to the received radio signals of the radio transmitter (520) received by the receivers (120a, 120b, 120c);

provide data entities (301), each data entity (301) comprising the calculated position coordinates of the tag (110) associated with a timestamp and/or an index number to the processing controller (150); and wherein the processing controller (150) is configured to:

determine the walked distance of a given said animal (101) associated with the tag (110) comprising the tag identity by estimating a walked trajectory (450) during the predetermined time period, by:

detecting whether a gap (420) exceeding a threshold time, of a plurality of missing or incomplete said data entities (301) in sequence among the obtained data entities (301) exists;

if the gap is not detected, establishing the walked trajectory (450) based on the obtained data entities (301), and storing the established walked trajectory (450) in the database (140) associated with the given said animal (101), and if the gap is detected, establishing the walked trajectory (450) by inserting a replacement distance data in the detected gap (420) exceeding the threshold time, of a plurality of the missing or incomplete data entities (301) in sequence among the obtained data entities (301), based on historical trajectories (430) extracted from the database, and wherein the database (140) comprises a virtual representation (300) of the barn (200) wherein the walls and movement restrictions (210, 220, 230) of the barn (200)

have a corresponding virtual restriction (310, 320, 330) with corresponding positions; and wherein the processing controller (150) is configured to insert the replacement distance data in the detected gap (420) exceeding the threshold time, of a plurality of the missing or incomplete data entities (301) in sequence among the obtained data entities (301), based on knowledge about positions of movement restrictions (210, 220, 230) in the barn (200), extracted from the database (140).

12. The system (100) according to claim 11, wherein the processing controller (150) is configured to, when the gap (420) exceeding the threshold time, of a plurality of the missing or incomplete data entities (301) in sequence among the obtained data entities (301) is detected:

determine a segment of the movement restrictions (310, 320, 330) corresponding with the area (440) of the barn (200) wherein the gap (420) exceeding the threshold time, of a plurality of the missing or incomplete data entities (301) in sequence among the obtained data entities (301) is detected; and obtain the replacement distance data based on the determined segment of the movement restrictions (310, 320, 330) in the area (440).

* * * * *